Nov. 22, 1955 — W. J. FLECK — 2,724,349
DOUGHNUT DEVICE
Filed Oct. 3, 1952 — 2 Sheets-Sheet 1
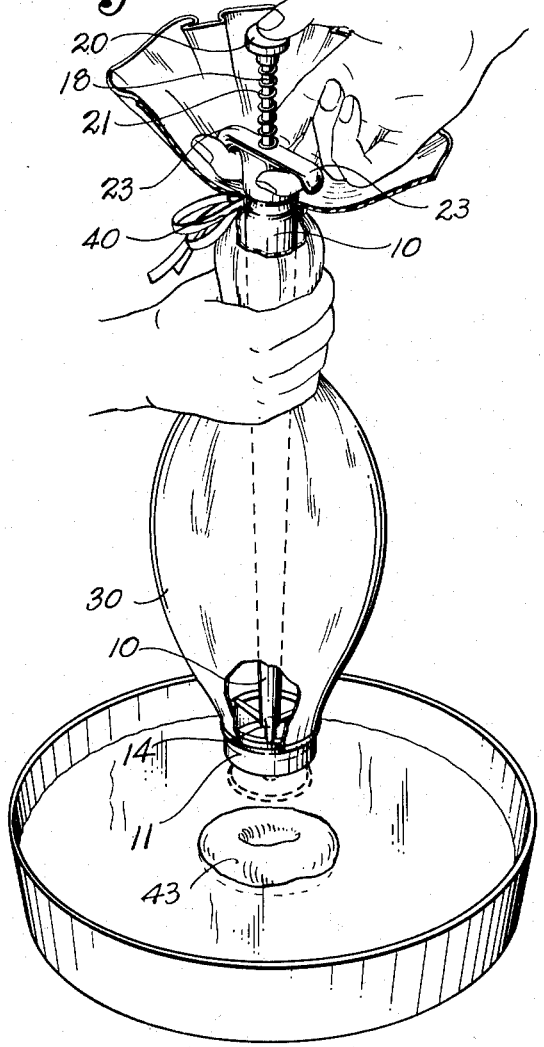
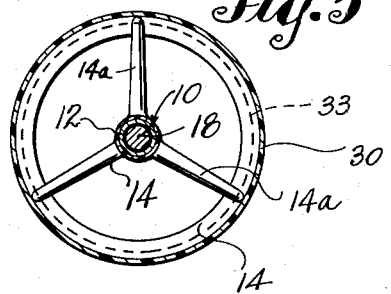
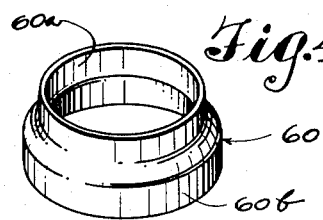
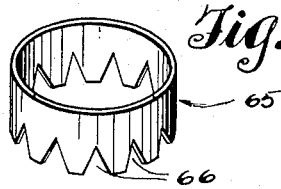
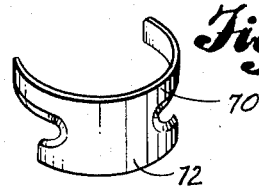
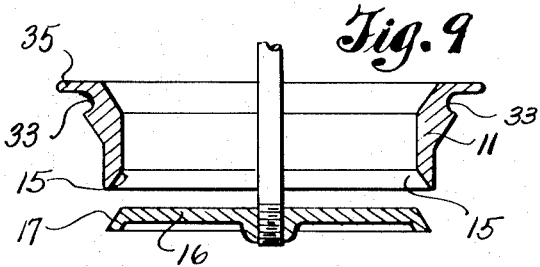
INVENTOR.
WILLIAM J. FLECK
BY
Cook & Robinson
ATTORNEYS Nov. 22, 1955  W. J. FLECK  2,724,349
DOUGHNUT DEVICE
Filed Oct. 3, 1952  2 Sheets-Sheet 2
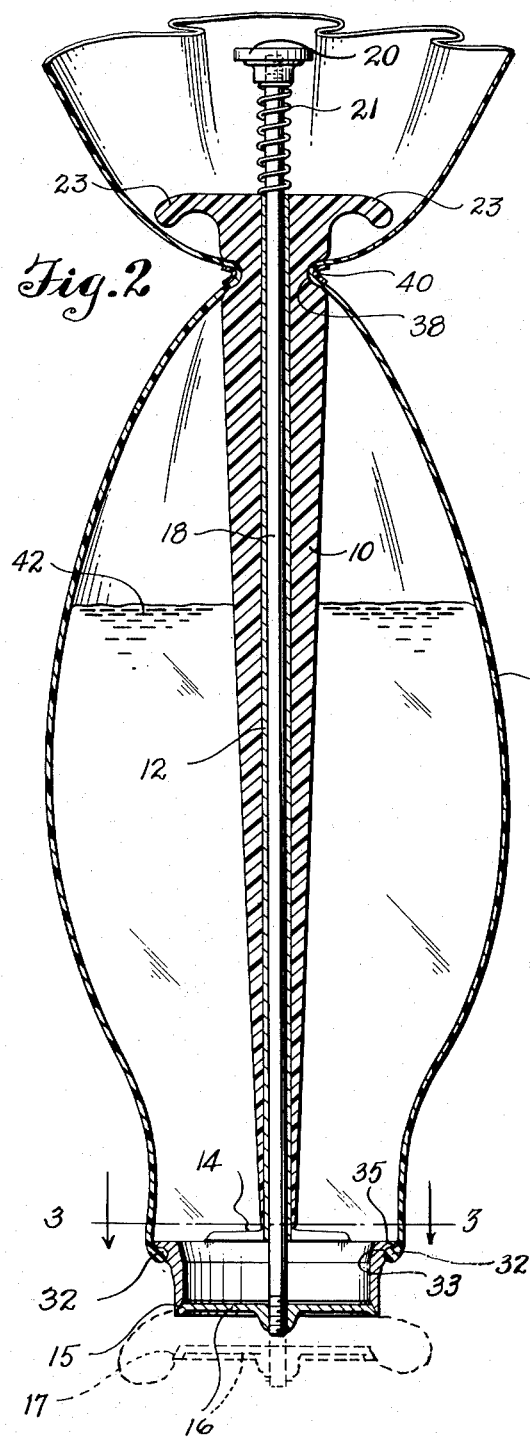
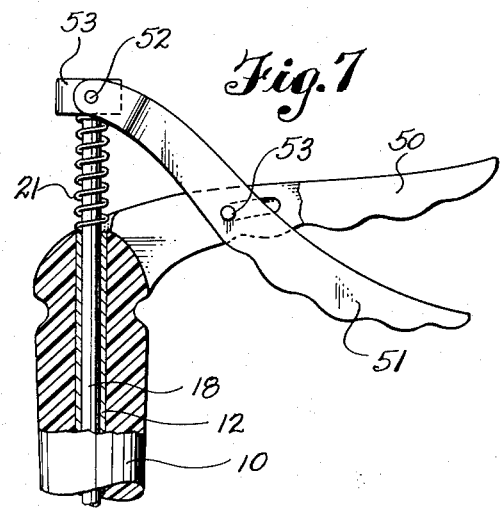
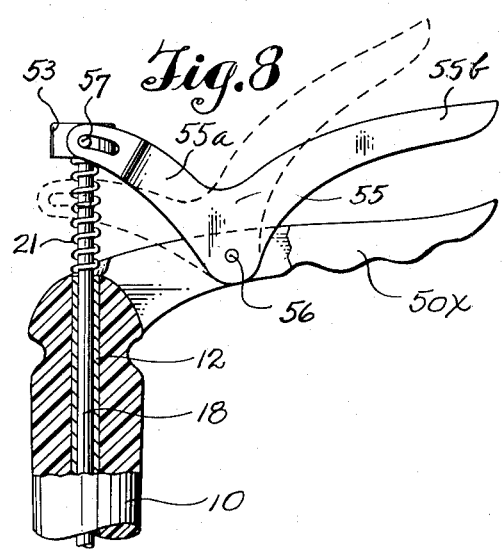
INVENTOR.
WILLIAM J. FLECK
BY
Cook + Robinson
ATTORNEYS

United States Patent Office 2,724,349
Patented Nov. 22, 1955

2,724,349

DOUGHNUT DEVICE

William J. Fleck, Spokane, Wash.

Application October 3, 1952, Serial No. 312,977

7 Claims. (Cl. 107—14)

This invention relates to doughnut forming devices. More particularly, the invention relates to a doughnut maker that is especially adapted for home or domestic use, for the making of small batches of doughnuts as distinguished from the larger types of power or hand driven machines as used in factories and in bakeries where large quantities are mechanically formed and handled.

It is the principal object of this invention to provide a simple, practical, relatively inexpensive and easy to use device for the forming of doughnuts from a dough of semi-fluid consistency, thus to materially lessen the time and work required as compared to the usual operation of rolling out the dough, cutting the doughnuts therefrom and then hand dropping them into the cooking grease.

More specifically stated, the present invention resides in the provision of a doughnut maker comprising a bag of flexible plastic, canvas or other suitable material, in which a batch of soft dough may be contained, and which bag is equipped at the lower end with a discharge or extrusion nozzle having a cut-off valve associated therewith; the bag when in use being held about the top and thereby closed, and the dough being caused to be extruded through the nozzle outlet by application of squeezing pressure applied by hand to the bag and the doughnut formed by a controlled opening and closing of the cut-off valve.

It is a further object of the present invention to provide a doughnut forming device of the above character that permits the doughnuts, as formed by extrusion of dough from the nozzle past the valve, to be dropped directly into the cooking grease. Also, to provide valve control means that permits the doughnuts to be controlled in size within certain limits.

Another object of the invention is to provide a doughnut forming device of the kind above stated having a tubular center post fixed to the nozzle and enclosed within the bag for the gathering of the open upper end of the bag thereabout, and wherein the cut-off valve as applied to or associated with the nozzle, is manually operable between open and closed positions by a push and pull rod that is slidably contained within the tubular post and extends from its upper end for actuation.

Another object of the invention resides in a detail of construction of the lower end of the bag for the reception of the nozzle and the securing of the bag to the nozzle in a dough tight connection. Furthermore, in the provision of an encircling channel in the upper end portion of the center post about and into which the side walls of the upper end portion of the bag may be drawn and secured by means of a tie, thus to close that end of the bag against any outflow of dough under the application to the bag of the dough extruding pressure.

Still another object of my invention is to provide a novel lever mechanism in combination with spring means for the actuation and control of the cut-off valve.

Yet another object of the invention is to provide interchangeable attachment devices for application to the extrusion nozzle to make possible the formation of doughnuts of different size and pattern.

Still further objects of the invention are to be found in the details of construction of the various parts of the device, in their relationship and combination with each other, and in the mode of use of the device as will hereinafter be fully described.

In accomplishing these and other objects of the invention, I have provided the improved details of construction, the preferred forms of which are illustrated in the accompanying drawings, wherein—

Fig. 1 is a perspective view of a doughnut forming device embodied by the present invention, and illustrating the manner of its functional use; a part of the bag being broken away to better show the attachment of the nozzle to the center post.

Fig. 2 is a vertical, sectional view of the device, showing the extrusion nozzle, the center post, the cut-off valve, the valve actuating members and the dough holding bag as applied to the nozzle and center post.

Fig. 3 is a horizontal cross-section taken on line 3—3 in Fig. 2.

Figs. 4, 5 and 6 are perspective views showing, respectively, three different forms of nozzle attachments for the making of doughnuts of various patterns.

Fig. 7 is a sectional detail showing an alternative form of valve actuating means comprising a handle and lever combination.

Fig. 8 is a similar view of another alternative form of valve actuating means.

Fig. 9 is a sectional detail of the nozzle and valve.

Referring more in detail to the drawings—

The present device is designed for use in the making of what might be considered to be small quantities of doughnuts and therefore, it is especially adapted for home use, although not necessarily limited thereto. Furthermore, the present device provides for the forming of doughnuts from soft dough, that is, from dough of semi-fluid consistency, thus simplifying the usual doughnut making operation by eliminating the extra work of rolling out the dough and individually cutting the doughnuts therefrom.

In its present preferred form of construction, the device comprises a rigid center post 10 to the lower end of which the extruding nozzle 11 is rigidly fixed. As shown best in Figs. 2 and 3, the post 10 is tubular and is conically tapered from the upper end to its lower end. It may be formed of plastic, wood or other suitable material. Fixed within the post, coaxially thereof, is a metal tube 12 of small diameter which at its lower end extends beyond the post and is fixed rigidly to a metal spider 14. The spider, as seen in Fig. 3, has three radial arms 14a which are welded or otherwise secured at their ends to the upper end of the nozzle 11.

The nozzle 11 is of cylindrical form, and is open at both ends. It is shown to be slightly flared at its upper end. About its lower end opening the nozzle wall is beveled to provide a conical seat 15 for a dough retaining and cut-off valve 16. This valve comprises a flat disk-like plate that is beveled about its peripheral edge, as at 17, to close tightly against the seat 15 as has been shown in Fig. 2. This valve plate is threaded onto the lower end of a rod 18 that is slidably fitted in the tube 12. The upper end portion of the rod extends from the upper end of the post 10 and tube 12 and has a press button 20 threaded thereonto. A coiled spring 21 is applied about this extended upper end portion of the rod 18 and is held under compression between the upper end surface of the post and the press button. This spring is of such strength that it will not only normally hold the valve disk 16 in a position tightly closed against the nozzle seat 15 as in full lines in Fig. 2, but in closing will cut off the dough that is being extruded.

For convenience in use of the device, the post 10 is equipped at its upper end with two oppositely directed and downturned finger engaging hooks 23—23, as shown in Fig. 1. The first two fingers of the hand are to be engaged with these hooks to support the device while the thumb of the same hand is applied against the press button to open the valve against the holding pressure of the coiled spring 21. When pressure against the button is relieved, the spring moves the valve to closed position and effects the cutting off of extruded dough.

For containing a batch of dough for the making of doughnuts, I provide a bag 30 made of thin flexible plastics, such as a polyethylene plastic film, or of other suitable flexible material. The bag is somewhat of funnel form, and is formed at the lower, or smaller end with a round opening through which the nozzle 11 is projected as well shown in Fig. 2. The lower end opening of the bag is surrounded or defined by a peripheral bead 32 adapted to be snugly contained in an outwardly opening channel 33 that is formed in and encircles the upper end portion of the nozzle. Immediately above the channel 33, the nozzle is formed with a horizontally extending, annular flange 35 that precludes the possibility of the nozzle slipping downwardly from the bag opening under the extruding pressure applied against the dough.

The bag is of such length that its upper open end extends above the post, as in Fig. 2, and that end portion can be gathered about the post and then tightly secured. To make this possible, the post is formed about its upper end portion, spaced below the finger hooks 23—23, with a rather deeply formed V-shaped channel 38 into which the bag walls may be drawn and secured by a suitable tie 40. When so secured, dough contained in the bag, and designated at 42 in Fig. 2, can be placed under pressure by contracting and squeezing the bag. When under such pressure, the dough can be extruded through the nozzle upon opening the valve 16. It can readily be understood that with the valve 16 open, as indicated in dotted lines in Fig. 2, pressure against the dough in the bag will force it from the nozzle and outwardly from between the valve disk and lower peripheral edge of the nozzle. The closing of the valve will cut this dough off to form a doughnut as at 43 in Fig. 1. The size of the doughnut can be controlled within certain limits by the pressure applied and the period of time which the cut-off valve remains open.

As an alternative means for holding the device in use and controlling the opening and closing action of valve 16, I have provided mechanism illustrated in Fig. 7, wherein it is shown that the post 10 is equipped at its upper end with a laterally extending handle 50. Associated with this is a lever 51 which, at its inner end is pivoted, as at 52, to a nut 53 that is fixed to the upper end of rod 18 in lieu of the button 20. The lever 51 is crossed with the handle 50 and has a pin and slot pivotal connection therewith as indicated at 53. Upon grasping the outer end portions of the handle 50 and lever 51, and squeezing them together, the rod 18 will be moved downwardly in the post and the valve 16 adjusted to an open position. Upon release of the opening pressure, the coiled spring 21, which is applied between nut 53 and post 10, will move the valve 16 back to closed position.

In Fig. 8, I have shown yet another alternative form of handle and lever mechanism for control of the valve 16.

In this combination of parts, the spring 21 as employed for closing the valve 16 is supplemented by a hand lever combination including a laterally extending handle lever 50x on which a lever 55 of bell crank form is pivotally mounted by pin 56. The bell crank lever has one arm 55a pivotally attached at its outer end, as at 57, to a nut 53 on the upper end of rod 18. The other arm, 55b, of the bell crank extends along and over the outer portion of handle 50x. By grasping these outer end portions of the handle and lever 55, and squeezing them together, the rod 18 will be pulled upwardly, thus to assist the spring 21 in cutting off the extruded dough. This is especially desirable when doughnuts are being made from a yeast raised dough which is not easily separated.

While in Figs. 7 and 8, I have shown the handle levers as being formed integral with the upper end portion of post 10, it is anticipated that the handle can be made as an independent part adapted to be applied about and secured tightly to the post. When so equipped for mounting, the handle and lever mechanism of either Fig. 7 or Fig. 8 can be releasably applied to the post of the device as shown in Figs. 7 and 8, or to the upper end of post 10 as shown in Fig. 2.

Assuming that the various parts have been constructed as described, and have been assembled as shown in Fig. 2 with a suitable quantity of dough in the bag 30, and the bag gathered about and secured to the post by the tie 40 as shown in Fig. 2, to use the device it is grasped by the two hands as shown in Fig. 1, and by squeezing the upper end portion of the bag, the dough is placed under pressure and caused to be extruded as indicated in dotted lines in Fig. 2 upon opening the valve 16. Under control of the valve and hand pressure, the doughnut is formed to a desired size, then pressure downwardly on button 20 is released and the spring 21 operates to close the valve and cut off the doughnut, permitting it to drop directly into the frying grease.

The device, if equipped with either of these hand levers of Fig. 7 or Fig. 8, is used in a like manner, the valve 16 here being under control of the spring and lever mechanism.

When the doughnut forming operation has been finished, the tie 40 is removed and the bag drawn downwardly and from the nozzle. Then all parts can be easily cleaned and made ready for use at a later time.

The fittings shown in Figs. 4, 5 and 6 are adapted to be applied about the nozzle, each as an extension thereof for the formation of a doughnut of some specific kind or pattern.

The fitting 60 of Fig. 4 is of cylindrical form and in stepped diameters. The upper portion 60a thereof is of such size as to snugly receive the lower end portion of the nozzle 11 therein. Its lower end portion is somewhat greater in diameter than the upper portion and will extend beyond the nozzle and it is formed with a valve seat in the same manner as is the nozzle 11. However, in using this attachment, the valve disk 16 as applied to rod 18 is removed and is replaced by a larger one that will close against the valve seat of the fitting. This enlarged outlet from the nozzle provides for the making of doughnuts of larger size than possible by the nozzle 11.

In Fig. 5, is shown an attachment sleeve 65 adapted to be fitted over and secured to the nozzle 11, as an extension thereof. The lower edge of this extension sleeve is formed with a succession of spaced, inverted V-shaped notches 66. When the valve 16 is depressed to partially open the extrusion passages provided by the notches, the dough can be extruded onto a table top in the form of petals, then by turning the nozzle, while so extruding the dough, these petal-like portions will be brought into a spirally overlapped relationship to produce a doughnut of special pattern.

To make a doughnut of "dunker" form, I provide an attachment piece of Fig. 6. This comprises a clip 70 adapted to be fitted about and secured to the nozzle 11 as an extension thereof. At one side it has a downwardly projecting lip 72 that is designed to close off any outflow of dough from the nozzle at that point, thus to form an open sided doughnut. When this doughnut is cooked, it tends to straighten out to an open crescent form.

By reference to Figs. 1 and 2, it will be noted that the bag 30 is of substantial length and that it extends above or is longer than the post 10. This elongated construction of the bag is for the definite purpose of enabling the user to fill the bag with relative ease, by first standing the entire unit within a can and then folding the upper portion of the bag downwardly over the rim or side wall of the can. Thus the bag is retained in an open position to readily receive the dough. When filled, the free edges of the bag can then be easily gathered together about the upper end portion of the post and the tie 40 applied thereabout.

A summary of the advantages should recite the easy separability of parts for cleaning; the simplicity of construction and use of minimum parts; the provision for use of dough of semi-fluid consistency; and the fact that by reason of the flexibility of the bag 30 and the use therewith of the rigid center post for support and positive handling of the device in the manner indicated in Fig. 1, it is possible to apply, maintain and regulate the extruding pressure against the dough by the twisting of the bag or by shifting the hand which grips its upper end portion farther down on the bag. The position of the nozzle can always be positively maintained by the same hand that grips and squeezes the bag, and the opening and closing actions of the valve, by the means shown either in Fig. 2, 7 or 8, can be accurately controlled.

Having thus described my invention, what I claim as new therein, and desire to secure by Letters Patent, is:

1. In a doughnut forming device, a pliable dough containing bag, an extrusion nozzle applied to the bottom of the bag and through which dough can be extruded from the bag by its contraction, a post fixed to the nozzle and extended upwardly therefrom within the bag, a dough cut-off disk below and fitted to the discharge end of the nozzle, a mounting rod for the disk extended longitudinally through the post and nozzle, and longitudinally movable therein; said disk being adjustable by downward movement of the rod to a spaced relationship from the nozzle end that will permit the ejection of the extruded dough between them as a circular body, and the disk being movable against the nozzle end to cut-off the extruded dough as an annular body.

2. A device as in claim 1 wherein the said bag is upwardly flared and open at its upper end, and means is provided for securing the bag about its upper end to the post so that it is held in fixed position when contracted by one hand while the other hand is used to apply downward pressure to the rod for movement of the disk.

3. A device as in claim 1 wherein the said bag extends substantially beyond the upper end of the post and is adapted to be secured to the post and held in fixed position during its use in the doughnut forming operation.

4. A device as in claim 1 wherein finger hooks are provided on the upper end of the post and the rod extends beyond said upper end, a press button applied to the end of rod and a spring applied to the rod between the upper end of the post and the press button.

5. A device as in claim 1 wherein crossed lever handles are secured to the ends of the rod and post respectively for actuation of the rod.

6. A device as in claim 5 wherein a coiled spring is applied to the rod between the upper ends of the post and rod respectively for retaining the rod in outwardly extended position.

7. A device as in claim 1 wherein the nozzle is formed with an outwardly projecting flange about the upper end thereof and an encircling channel in the nozzle adapted to receive a peripheral band on the lower end of the bag.

References Cited in the file of this patent

UNITED STATES PATENTS

| | | |
|---|---|---|
| 1,839,180 | Bergner | Dec. 29, 1931 |
| 2,197,270 | Helland | Apr. 16, 1940 |
| 2,262,485 | Belshaw | Nov. 11, 1941 |
| 2,447,182 | Hutchinson | Aug. 17, 1948 |
| 2,521,627 | Birch | Sept. 5, 1950 |